United States Patent
Khadloya et al.

(10) Patent No.: US 11,282,389 B2
(45) Date of Patent: Mar. 22, 2022

(54) PEDESTRIAN DETECTION FOR VEHICLE DRIVING ASSISTANCE

(71) Applicant: Nortek Security & Control LLC, Carlsbad, CA (US)

(72) Inventors: Krishna Khadloya, San Jose, CA (US); Chandan Gope, Cupertino, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 201 days.

(21) Appl. No.: 16/280,757

(22) Filed: Feb. 20, 2019

(65) Prior Publication Data

US 2019/0259284 A1 Aug. 22, 2019

Related U.S. Application Data

(60) Provisional application No. 62/632,851, filed on Feb. 20, 2018.

(51) Int. Cl.
*G08G 1/16* (2006.01)
*G06K 9/62* (2022.01)
(Continued)

(52) U.S. Cl.
CPC ........... *G08G 1/166* (2013.01); *G06K 9/6256* (2013.01); *G06K 9/6267* (2013.01); *G06T 7/20* (2013.01);
(Continued)

(58) Field of Classification Search
CPC .. G08G 1/166; G06K 9/00805; G06K 9/6267; G06K 9/6256; G06K 9/00369;
(Continued)

(56) References Cited

U.S. PATENT DOCUMENTS 6,956,469 B2  10/2005  Hirvonen et al.
9,239,380 B2   1/2016  Hegemann et al.
(Continued)

FOREIGN PATENT DOCUMENTS

CN    104504395    4/2015
CN    106022237    10/2016
(Continued)

OTHER PUBLICATIONS

"Object Detection Using Convolutional Neural Networks", GLUON 0.1—Deep Learning—The Straight Dope, [Online] Retrieved from the internet on May 22, 2019: URL: https: gluon.mxnet.io chapter08_computer-vision object-detection.html, (2017), 17 pgs.
(Continued)

*Primary Examiner* — Xuemei G Chen
(74) *Attorney, Agent, or Firm* — Schwegman Lundberg & Woessner, P.A.

(57) ABSTRACT

Driver and pedestrian safety can be aided by systems and methods to provide identification and classification of objects in a vehicle travel path. Information about classified objects can be shared with a human driver to inform the driver about potentially hazardous conditions, or the information can be interpreted automatically by an operating system of the vehicle. In an example, a camera coupled to a vehicle can receive images from an image sensor. A computer system can use machine learning and neural network-based processing to identify an object present in the images and determine whether the object is a pedestrian. In an example, the computer system can process information from a region of interest in the images that comprises less than an entire field of view in the images.

18 Claims, 8 Drawing Sheets

(51) Int. Cl.
*G06T 7/20* (2017.01)
*G06T 7/00* (2017.01)
*G06V 20/58* (2022.01)

(52) U.S. Cl.
CPC ............... *G06T 7/97* (2017.01); *G06V 20/58* (2022.01); *G06T 2207/10016* (2013.01); *G06T 2207/20081* (2013.01); *G06T 2207/30196* (2013.01); *G06T 2207/30241* (2013.01); *G06T 2207/30261* (2013.01)

(58) Field of Classification Search
CPC ........... G06K 9/3233; G06T 7/20; G06T 7/97; G06T 2207/10016; G06T 2207/30261; G06T 2207/20081; G06T 2207/30196; G06T 2207/30241
See application file for complete search history.

(56) References Cited

U.S. PATENT DOCUMENTS

| | | | |
|---|---|---|---|
| 9,760,806 B1* | 9/2017 | Ning | B60W 50/14 |
| 9,786,178 B1 | 10/2017 | Bai et al. | |
| 9,925,939 B2 | 3/2018 | Rosenbaum et al. | |
| 10,013,773 B1 | 7/2018 | Ogale et al. | |
| 10,055,652 B2 | 8/2018 | Myers et al. | |
| 10,089,575 B1* | 10/2018 | Redmon | G06N 3/049 |
| 10,318,827 B2* | 6/2019 | Jia | G06K 9/00369 |
| 10,445,885 B1* | 10/2019 | Nathan | G06K 9/4642 |
| 10,558,224 B1* | 2/2020 | Lin | G08G 1/165 |
| 10,564,638 B1* | 2/2020 | Lockwood | G05D 1/0044 |
| 2005/0131646 A1* | 6/2005 | Camus | G01S 3/7864 701/301 |
| 2015/0110344 A1* | 4/2015 | Okumura | G06K 9/00624 382/103 |
| 2015/0170002 A1* | 6/2015 | Szegedy | G06K 9/4628 382/156 |
| 2017/0109940 A1* | 4/2017 | Guo | G06T 3/00 |
| 2017/0124409 A1 | 5/2017 | Choi et al. | |
| 2017/0153639 A1* | 6/2017 | Stein | G05D 1/0246 |
| 2017/0205506 A1* | 7/2017 | Voorheis | G01S 13/66 |
| 2017/0206426 A1 | 7/2017 | Schrier et al. | |
| 2017/0213081 A1* | 7/2017 | Nathan | G06T 7/11 |
| 2017/0270374 A1* | 9/2017 | Myers | G06K 9/00369 |
| 2017/0344808 A1* | 11/2017 | El-Khamy | G06K 9/00228 |
| 2017/0351936 A1 | 12/2017 | Jiang | |
| 2017/0364757 A1 | 12/2017 | Rajabizadeh et al. | |
| 2018/0012411 A1* | 1/2018 | Richey | G06T 19/006 |
| 2018/0025636 A1* | 1/2018 | Boykin | G06K 9/00335 701/1 |
| 2018/0032840 A1* | 2/2018 | Yu | G06T 7/11 |
| 2018/0082137 A1* | 3/2018 | Melvin | B60W 30/09 |
| 2018/0089505 A1 | 3/2018 | El-Khamy et al. | |
| 2018/0089593 A1* | 3/2018 | Patel | G06N 5/003 |
| 2018/0126903 A1* | 5/2018 | Herrmann | B60R 1/00 |
| 2018/0150701 A1* | 5/2018 | Kang | G06K 9/78 |
| 2018/0158189 A1 | 6/2018 | Yedla et al. | |
| 2018/0173971 A1 | 6/2018 | Jia et al. | |
| 2018/0174046 A1 | 6/2018 | Xiao et al. | |
| 2018/0189532 A1* | 7/2018 | Bataller | G06K 9/3233 |
| 2018/0204076 A1 | 7/2018 | Tripathi et al. | |
| 2018/0211403 A1 | 7/2018 | Hotson et al. | |
| 2018/0334108 A1* | 11/2018 | Rotzer | G06K 9/00791 |
| 2018/0373263 A1* | 12/2018 | Gray | G05D 1/0077 |
| 2019/0012548 A1* | 1/2019 | Levi | G06K 9/00805 |
| 2019/0042860 A1* | 2/2019 | Lee | G06K 9/00798 |
| 2019/0087672 A1* | 3/2019 | Wang | G06K 9/6288 |
| 2019/0092235 A1* | 3/2019 | Kim | G06T 7/11 |
| 2019/0096086 A1* | 3/2019 | Xu | G06T 7/60 |
| 2019/0179316 A1* | 6/2019 | Siskind | G05D 1/10 |
| 2019/0205667 A1* | 7/2019 | Avidan | G06K 9/6255 |
| 2019/0236386 A1* | 8/2019 | Yu | A61B 3/145 |
| 2019/0244028 A1* | 8/2019 | Jones | G06K 9/6277 |
| 2019/0283746 A1* | 9/2019 | Shalev-Shwartz | G05D 1/0246 |
| 2019/0291727 A1* | 9/2019 | Shalev-Shwartz | G01C 21/3602 |
| 2020/0057904 A1* | 2/2020 | Amon | G06K 9/38 |
| 2020/0086889 A1* | 3/2020 | Kaneko | G08G 1/096725 |
| 2020/0279389 A1* | 9/2020 | McIver | G06T 7/12 |
| 2020/0294245 A1* | 9/2020 | Oyaizu | G06T 7/20 |

FOREIGN PATENT DOCUMENTS

| | | |
|---|---|---|
| CN | 106407931 | 2/2017 |
| CN | 106650647 | 5/2017 |
| CN | 106845374 | 6/2017 |
| CN | 106934344 | 7/2017 |
| CN | 104063719 | 1/2018 |

OTHER PUBLICATIONS

"Mobileye Pedestrian Collision Warning", Lichtsinn RV, [Online] Retrieved from the internet: URL:https: wwwlichtsinn.com about-us video-library rv-parts-and-accessories mobileye-pedestrian-collision-warning-rv, (retrieved May 22, 2019), 2 pgs.

"New Ford Pre-Collision Assist with Pedestrian Detection Technology May Help Drivers Avoid Some Frontal Crashes", Ford Media Center, Dearborn, Mich., [Online] Retrieved from the internet on May 22, 2019: URL: https: media. ford com content fordmedia fna us en news 2014 10 23 new-ford-pre-collision-assist-with-pedestrian-detection.html, (Oct. 23, 2014), 2 pgs.

Aghav, Jagannath, "Deep learning for Real Time Collision Detection and Avoidance", Proc. of Intl. Conference on Communication, Computing and Networking, [Online] Retrieved from the internet on May 22, 2019: URL: https: scholar. google.com scholar?hl=enandas_sdt=0%2C24andq=Deep+learning+for+Real+Time+Collision+Detection+and+AvoidanceandbtnG=, (2017), 6 pgs.

Angelova, Anelia, "Real-Time Pedestrian Detection With Deep Network Cascades", Proc. of BMVC, (2015), 12 pgs.

El Ansari, Mohamed, "A Hybrid Pedestrian Detection System based on Visible Images and LIDAR Data", Proc. of the 13th Intl. Joint Conference on Computer Vision, Imaging and Computer Graphics Theory and Applications (VISIGRAPP), vol. 5: VISAPP, (2018), 10 pgs.

Ge, Junfeng, "Real-Time Pedestrian Detection and Tracking at Nighttime for Driver-Assistance Systems", IEEE Transactions on Intelligent Transportation Systems, 10(2), (Jun. 2009), 16 pgs.

Jung, Heechul, "End-to-End Pedestrian CollisionWarning System based on a Convolutional Neural Network with Semantic Segmentation", arXiv:1612.06558v1 [cs.CV], (2016), 6 pgs.

Sampath, V.P., "Convolutional Neural Networks for Autonomous Cars", electronicsforu.com, [Online] Retrieved from the internet on May 22, 2019: URL: https: electronicsforu.com market-verticals automotive convolutional-neural-networks-autonomous-cars-part-1-2 3, (2018), 7 pgs.

Shashua, Amnon, "Pedestrian Detection for Driving Assistance Systems: Single-frame Classification and System Level Performance", IEEE Intelligent Vehicles Symposium, (2004), 6 pgs.

Szarvas, Mate, "Real-time Pedestrian Detection Using LIDAR and Convolutional Neural Networks", IEEE Intelligent Vehicles Symposium, (2006), 6 pgs.

\* cited by examiner

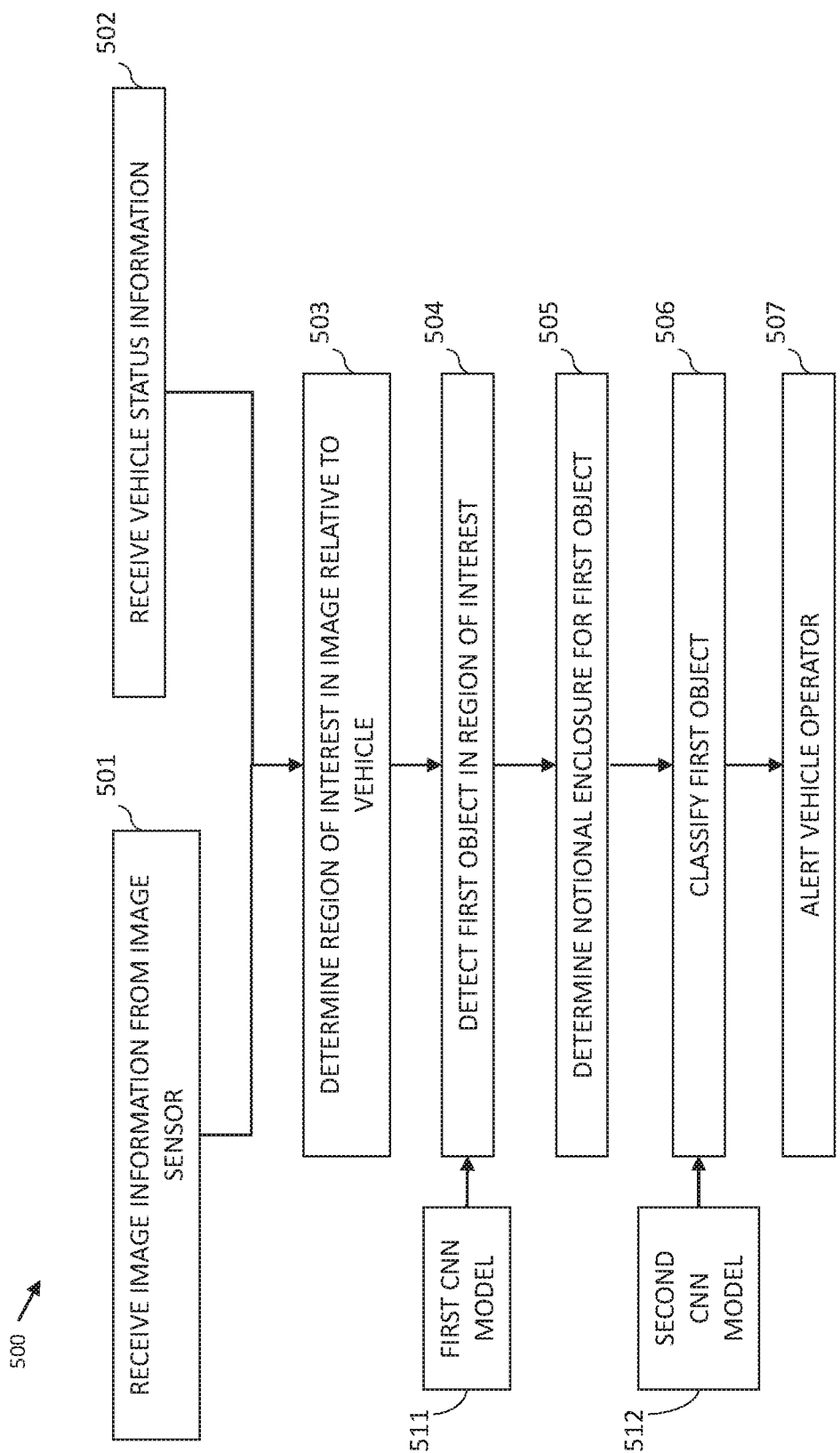

PEDESTRIAN DETECTION FOR VEHICLE DRIVING ASSISTANCE

CLAIM OF PRIORITY

This patent application claims the benefit of priority of U.S. Provisional Patent Application Ser. No. 62/632,851, entitled "Efficient Deep Learning Algorithms for Pedestrian Collision Warning for Advanced Driver Assistance", filed on Feb. 20, 2018, which is incorporated by reference herein in its entirety.

BACKGROUND

Autonomous vehicles or vehicles with driving assistance can have on-board systems configured to detect surroundings of a vehicle. For example, a vehicle can include a system with sensors such as vision sensors, range sensors, and depth sensors to detect objects within a specified distance or range of the vehicle. Based on the sensor information, the vehicle can be steered, automatically or manually, to avoid collisions.

Some vehicles include a collision avoidance system to ensure safety of passengers and pedestrians. A collision avoidance system can detect surrounding of a moving vehicle and alert a driver when there is a possibility of a collision with any object. Accuracy of such system is crucial as any error can lead to a risk to human life. For example, an error in detection of a pedestrian can lead to a collision of the vehicle with the pedestrian and can result in damage to the pedestrian, the vehicle, the driver of the vehicle, or other property.

SUMMARY

Various systems and techniques can be used to automatically detect pedestrians in or near a vehicle path and then alert a driver of any detected pedestrian. Although this document refers to pedestrians, the systems and methods discussed herein can similarly be applied to detect other non-human objects in or near a vehicle path.

In an example, a system can include or use computer vision techniques such as having a feature extraction phase followed by a classification phase. The feature extraction phase can include feature extraction of objects in an area near a vehicle or near a detector. Some features that can be extracted from a detector, or other sensor data, can include gray-scale values, Haar representations, edge features, gradients, and histograms of gradients (HOG) for any one or more of the objects. Based on the extracted features, the objects can be classified into categories, such as can be predefined by a user or can be learned by the system. In an example, other techniques such as Support Vector Machines (SVM), a boosted cascade technique, and a random forest technique can similarly be used to identify features of objects sensed in an environment by a sensor.

Deep learning techniques can similarly be used for pedestrian detection and collision avoidance. In an example, deep learning techniques can use detection proposals generated by mechanisms such as channel features that can be classified using a Convolutional Neural Network (CNN). In an example, some techniques combine a tiny deep network with a modified CNN technique (e.g., a "tiny neural network" or tinn) in a sliding window manner.

Accuracy of pedestrian detection algorithms can be critical to avoid generating false alerts that could be distracting to a driver. For example, a system configured to alert a driver about any and all detected pedestrians in an area near a vehicle, including pedestrians who are not, or who are not likely to be, on a collision path with a vehicle, can consume a large amount of processing resources and generate driver alerts that could be distracting or misleading.

In an example, some systems can be configured to perform pedestrian recognition at a high rate of speed and use a correspondingly large amount of power. Such systems may not be useful in low power or power-limited applications. In an example, a system can include a dedicated Graphics Processor Unit (GPU) to achieve high processing speeds with reasonable accuracy. A GPU can be expensive and contribute to a relatively high cost of some collision avoidance systems.

The present inventors have recognized, among other things, that a problem to be solved can include providing accurate, fast, and inexpensive systems to perform pedestrian detection particularly for use in vehicles. The present subject matter can help provide a solution to this problem, such as by providing a two-stage classifier wherein the first stage uses a first neural network optimized for fundamental object recognition and the second stage uses a different second neural network to identify or classify the objects. In an example, an efficiency of the system is enhanced because results from the first classifier stage can be used to trim or identify a subset of image data or image information for further processing by the second stage. In other words, the first stage can be a coarse filter for identifying potential pedestrians in an image, and the second stage can be a fine filter to positively identify pedestrians using on particular portions of an image that were identified as including or potentially including a pedestrian.

In an example, a pedestrian detection system implemented in a vehicle can include an input unit comprising at least one image sensor for receiving image information about areas around a vehicle. The system can include a processor circuit and memory, the memory storing instructions executable by the processor circuit to receive at least one image from the input unit, detect one or more objects present in the at least one image and generate a notional enclosure or box around each of the detected one or more objects such as by using a first Convolutional Neural Network (CNN) model. The notional enclosure or box can indicate coordinates corresponding to the one or more objects. The instructions can further configure the processor to determine whether any of the detected one or more objects is a pedestrian such as using a second CNN model. The determination can be based on locations of the notional enclosures for each of the one or more objects in the at least one image, or in multiple images. In an example, the system can generate an alert to a driver or other vehicle occupant when a pedestrian is positively identified in an area near the vehicle.

In an example, the instructions can configure the processor circuit to determine a region-of-interest (ROI) for at least one image. The ROI can be based at least in part on a direction and/or rate of travel of the vehicle. In an example, the ROI can indicate a collision-prone area in proximity of the vehicle. In an example, the one or more objects can be detected in the determined ROI, and in an example, a pedestrian can be detected in the ROI. The system can generate a collision alert indicating a potential collision of the vehicle with a pedestrian when a pedestrian is identified in the ROI.

In an example, the instructions can configure the processor circuit to track movement of each of the one or more objects. For example, a change in coordinates of corresponding notional enclosures or virtual boxes can be used, such as from a series of consecutive images received from an image sensor on-board a vehicle, to determine information about object movement near the vehicle.

In an example, the instructions can configure the processor circuit to determine whether each of the one or more objects moves in a direction toward or away from the vehicle, such as based on one or more of a driving lane of the vehicle, a rate of travel of the vehicle, or other factors. In an example, the processor circuit can determine a driving lane of the vehicle using information detected about lane lines of a road of travel of the vehicle, and can optionally use information about a horizon point in a field-of-view of the vehicle driver.

Various CNN models or other clustering techniques can be used to generate the notional enclosures for detected objects and/or to determine whether a pedestrian is present in a particular image. In an example, a CNN model can include a single-pass deep CNN model. In an example, a CNN model can include a network model that is trained using multiple images of pedestrians or humans, including humans of different sizes, shapes, body types, genders, features, etc. In an example, the processor circuit can modify one or more of the notional enclosures based on the human data with which the model is trained.

Aspect 1 can include or use subject matter (such as an apparatus, a system, a device, a method, a means for performing acts, or a device readable medium including instructions that, when performed by the device, can cause the device to perform acts, or an article of manufacture), such as can include or use a method for determining whether an object is in a travel path of a vehicle. In an example, Aspect 1 includes receiving one or more images from an image sensor, the image sensor coupled to a vehicle and the one or more images corresponding to a first field of view (FOV), and identifying, using a computer system, a first object present in the one or more images. Aspect 1 can further include determining, using the computer system, a notional enclosure for the first object, and classifying, using the computer system, the first object in the notional enclosure as including an ambulatory object or a non-ambulatory object. In an example, when the first object is classified as an ambulatory object, then Aspect 1 can include determining, using the computer system, whether the ambulatory object is in a potential collision path with the vehicle and providing an alert to an operator of the vehicle about the ambulatory object or about the potential collision path.

Aspect 2 can include or use, or can optionally be combined with the subject matter of Aspect 1, to optionally include identifying the first object present in the one or more images includes using a computer system to apply a machine learning-based first neural network model to the one or more images and receiving an indication that the one or more images includes the first object.

Aspect 3 can include or use, or can optionally be combined with the subject matter of Aspect 2, to optionally include determining the notional enclosure for the first object includes using the computer system to apply the same first neural network model or a different second neural network model to generate information about one or more coordinates corresponding to the first object in the one or more images.

Aspect 4 can include or use, or can optionally be combined with the subject matter of Aspect 3, to optionally include classifying the first object in the notional enclosure includes using the computer system to apply a different third neural network model to classify the first object as an ambulatory object or a non-ambulatory object.

Aspect 5 can include or use, or can optionally be combined with the subject matter of Aspect 4, to optionally include classifying the first object includes using the different third neural network model to classify the first object as a pedestrian or a non-pedestrian.

Aspect 6 can include or use, or can optionally be combined with the subject matter of one or any combination of Aspects 2 through 5 to optionally include determining a region of interest (ROI) in the one or more images, the ROI comprising less than all the information in each of the one or more images. In an example, in Aspect 6, identifying the first object and/or the determining the notional enclosure includes using a portion of the one or more images corresponding to the ROI.

Aspect 7 can include or use, or can optionally be combined with the subject matter of Aspect 6, to optionally include receiving information about a travel direction or rate of travel of the vehicle, and determining the ROI can include using information about the travel direction or the rate of travel to determine which portion of the one or more images to include in the ROI.

Aspect 8 can include or use, or can optionally be combined with the subject matter of Aspect 7, to optionally include determining an exclusion area that comprises a portion of the FOV but is outside of the ROI, and identifying the first object present in the one or more images can include identifying the first object inside of the ROI and outside of the exclusion area.

Aspect 9 can include or use, or can optionally be combined with the subject matter of one or any combination of Aspects 1 through 8 to optionally include receiving information about or determining a travel direction or a rate of travel of the ambulatory object based on information from multiple ones of the images, and using information about the travel direction or the rate of travel to determine whether the ambulatory object is in the potential collision path with the vehicle.

Aspect 10 can include or use, or can optionally be combined with the subject matter of Aspect 9, to optionally include determining respective notional enclosures for the same first object in respective consecutive images received from the image sensor, and determining the travel direction can include using information about the notional enclosures.

Aspect 11 can include or use, or can optionally be combined with the subject matter of one or any combination of Aspects 1 through 10 to optionally include receiving the one or more images from the image sensor includes receiving consecutive images from the same camera or receiving images from different cameras having different fields of view.

Aspect 12 can include or use, or can optionally be combined with the subject matter of one or any combination of Aspects 1 through 11 to optionally include providing the alert to the operator of the vehicle, including providing one or more of a visual alert to a driver, an audible alert to a driver, or a control signal to an operational system of the vehicle.

Aspect 13 can include, or can optionally be combined with the subject matter of one or any combination of Aspects 1 through 12 to include or use, subject matter (such as an apparatus, a method, a means for performing acts, or a machine readable medium including instructions that, when performed by the machine, that can cause the machine to perform acts), such as can include or use a pedestrian detection system implemented in a vehicle. In an example, Aspect 13 can include an input unit comprising at least one image sensor for imaging areas around the vehicle and a processing unit comprising a processor circuit coupled with a non-transitory memory circuit, the memory circuit storing instructions executable by the processor circuit to cause the processor circuit to receive multiple frames of image information from the input unit and detect, using a first Convolutional Neural Network (CNN) model to analyze each of the multiple frames, one or more objects present in the frames and generate a notional enclosure around each of the one or more detected objects, wherein each notional enclosure indicates one or more coordinates of a respective enclosed object, and determine whether any of the detected one or more objects is a pedestrian using a second CNN model and using the coordinates of the notional enclosures.

Aspect 14 can include or use, or can optionally be combined with the subject matter of Aspect 13, to optionally include instructions executable by the processor circuit to cause the processor circuit to determine a region of interest (ROI) for at least one of the frames based on a rate of travel of the vehicle, wherein the ROI indicates a collision-prone area proximate the vehicle.

Aspect 15 can include or use, or can optionally be combined with the subject matter of Aspect 14, to optionally include the one or more objects are detected inside the determined ROI.

Aspect 16 can include or use, or can optionally be combined with the subject matter of one or any combination of Aspects 14 or 15 to optionally include instructions executable by the processor circuit to cause the processor circuit to determine an exclusion area inside of a field of view of the input unit and outside of the ROI.

Aspect 17 can include or use, or can optionally be combined with the subject matter of Aspect 16, to optionally include or use a driver interface configured to provide audio and/or visual cues to a driver of the vehicle about potential driving hazards, and wherein the instructions executable by the processor circuit are further configured to cause the processor circuit to provide an audible alert and/or a visual alert to the driver when the detected one or more objects is a pedestrian who is in the ROI.

Aspect 18 can include, or can optionally be combined with the subject matter of one or any combination of Aspects 1 through 17 to include or use, subject matter (such as an apparatus, a method, a means for performing acts, or a machine readable medium including instructions that, when performed by the machine, that can cause the machine to perform acts), such as can include or use a system for determining whether an object is in a travel path of a vehicle. In an example, Aspect 18 can include or use a first camera coupled to the vehicle and configured to receive image information about one or more areas around the vehicle and a processor circuit configured to apply a first convolutional neural network model to identify a first object present in the image information, determine a notional enclosure for the first object, apply a second convolution neural network model to classify the first object in the notional enclosure as including one of a non-ambulatory object, an ambulatory object not on a collision path with the vehicle, or an ambulatory object on a collision path with the vehicle, and provide an alert to an operator of the vehicle about the classified first object or about the collision path.

Aspect 19 can include or use, or can optionally be combined with the subject matter of Aspect 18, to optionally include the first convolutional neural network is a single-pass neural network model, and wherein the second convolutional neural network is trained using plurality of images of pedestrians, and wherein the processor circuit is further configured to scale image information corresponding to the notional enclosure to perform the classification of the first object using the second convolutional neural network.

Aspect 20 can include or use, or can optionally be combined with the subject matter of one or any combination of Aspects 18 or 19 to optionally include the first camera configured to receive image information that includes a series of sequential images. In an example, in Aspect 20, the processor circuit is configured to apply the first convolutional neural network model to identify the same first object in each image in the series of sequential images, and to determine respective notional enclosures for each instance of the first object in each image in the series of sequential images, and to determine whether the first object is in motion based on coordinate information about the respective notional enclosures, and to determine whether the first object is on a collision path with the vehicle using information determined about whether the first object is in motion.

Each of these non-limiting Aspects or examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

FIG. 5 illustrates generally an example of a method that can include using the system of FIG. 1 to identify objects in proximity of a vehicle.

DETAILED DESCRIPTION

Figure 1:
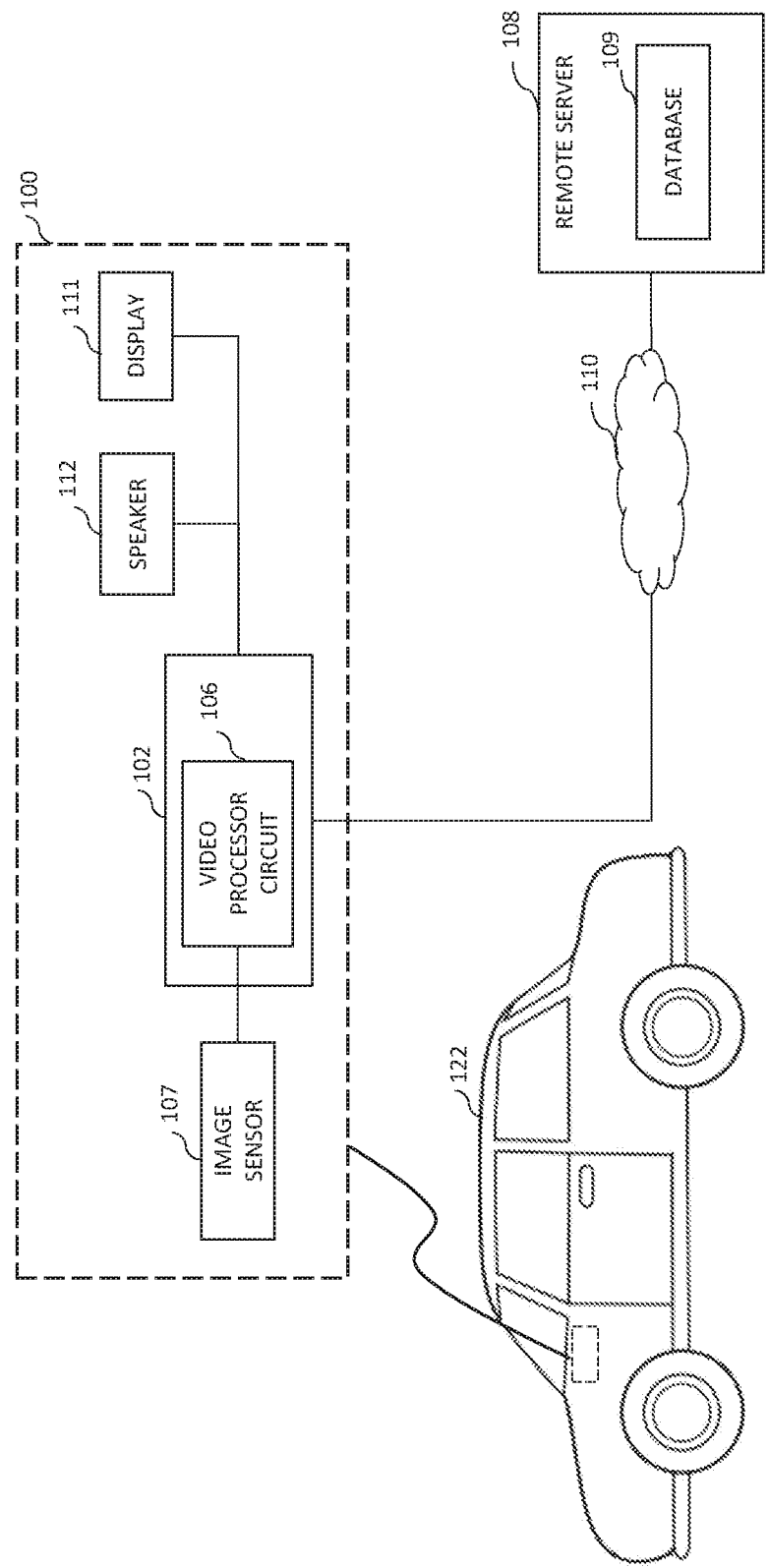
FIG. 1 illustrates an example of a pedestrian detection system configured for use with a vehicle.

The present subject-matter describes systems and methods for pedestrian detection and generation of a collision alert to assist in driving of a vehicle. A pedestrian detection system, sometimes referred to herein as "the system," can include an input unit with at least one image sensor or camera for receiving image information about an environment or area. In an example, the environment includes areas around a vehicle or a field-of-view of a vehicle driver. In an example, the system includes a processor circuit configured to receive at least one image from the input unit and detect one or more objects in the at least one image. In an example, the processor circuit is configured to determine whether a pedestrian is present in the at least one image.

The processor circuit can determine a region-of-interest (ROI) for image analysis. In an example, the ROI corresponds to a direction of travel of the vehicle. That is, if the vehicle is moving forward, then a region of interest can include areas in front of the vehicle or slight off to the sides of the vehicle. In an example, the processor circuit is configured to perform the object detection substantially or exclusively in the ROI. In an example, the ROI can be determined based in part on a rate of travel of the vehicle and can include or can indicate a collision-prone area around the vehicle.

In an example, the processor circuit can determine a notional enclosure or virtual box around each object. A notional enclosure can include information about a perimeter or extent or boundary of an object identified in an image. For example, if the object is a person, then the notional enclosure can include a polygon that generally follows contours or a perimeter of the person's body as the body is represented in the image. In an example, a first Convolutional Neural Network (CNN) model can be used to generate the notional enclosure. The notional enclosure can include or can indicate coordinates surrounding an identified object. In an example, the first CNN model can be a single-pass CNN model. In an example, the first CNN model has a limited depth and provides only coarse or rough detection of objects. In an example, the first CNN model has a high false alarm or false positive rate relative to, for example, a second CNN model discussed below.

In an example, the processor circuit can be configured to use information about corresponding notional enclosures from different images, or different time-adjacent image frames, to determine whether a detected object is a pedestrian, such as by applying a second CNN model. The second CNN model can be trained using plurality of images with different sizes or shapes of pedestrians. In an example, the processor circuit can be configured to modify, adjust, or scale information from a notional enclosure before the image information associated with the enclosure is processed according to the second CNN model.

In an example, the processor circuit can generate an alert when any object identified in an ROI is determined to be a pedestrian. The alert can be provided to a driver or other occupant of the vehicle. In an example, the processor circuit can generate a collision alert to indicate a potential collision of the vehicle with a pedestrian or other object.

In an example, the processor circuit can detect a change in coordinates of one or more notional enclosures such as using a series of images, such as using time-adjacent or consecutive images from the same image source, to track each object. Further, the processor circuit can determine whether the object is moving toward the vehicle, or moving toward a path that will intersect with a direction of travel of the vehicle. In an example, the processor circuit can use information about a driving lane or a vehicle rate of travel to determine whether a collision is likely or imminent. In an example, the processor circuit can determine or identify a driving lane of the vehicle by detecting one or more lane lines of a road, or by identifying a horizon point in a field-of-view of the vehicle driver.

In an example, the systems and methods discussed herein can be configured to provide a collision alert for a vehicle driver, and the collision alert is machine-generated based on deep machine learning techniques. Although the present disclosure is generally directed to driving assistance, the systems and methods can similarly be implemented in other domains with minor modifications to the architecture, without departing from the scope of the present disclosure. In an example, the present system is configured to use multiple CNN processing stages that help ensure that pedestrians outside of an ROI, such as pedestrians on a sidewalk, are identified as pedestrians who do not pose a collision risk and thereby false alerts can be minimized.

In an example, the first CNN model and the second CNN model are selected to complement each other to provide accurate results and reduce false positive alerts. In an example, the systems and methods discussed herein are configured to temporally track and validate identified objects across multiple frames. By temporally tracking and validating the objects, a processing load can be reduced because the tracked objects may not be re-analyzed by the second CNN model. That is, once the second CNN model positively identifies an object of interest, such as a pedestrian, then the object of interest can be tracked using only information from the first CNN model.

FIG. 1 illustrates an example of a pedestrian detection system 100 configured for use with a vehicle 122. The system 100 includes a first processor circuit 102 that can include one or more processing cores, and each core can have a respective different function. In an example, the first processor circuit 102 is a notional circuit that includes multiple different discrete processor circuits or cores that are coupled. In the example of FIG. 1, the first processor circuit 102 includes a video processor circuit 106, which can comprise a portion of the first processor circuit 102 or can be a dedicated graphics or image processor. The video processor circuit 106 can be a separate hardware processor entity, while in other examples, the video processor circuit 106 can be software-implemented and executed on the same or different processor circuit that is used for other functions. The system 100 further includes an image sensor 107 such as a camera that can receive image signals and provide image information to the video processor circuit 106.

In an example, the image sensor 107 includes a sensor with a particular field of view (FOV). In an example, the image sensor 107 includes two 180 degree view sensors, such as can be vertically joined back-to-back to provide a 360 degree view of the environment. In another example, the image sensor 107 includes a camera providing a 180 degree view in a horizontal direction. Such a single camera can be configured to rotate or look in a circular manner around the environment, and an image generated by such camera can be warped and de-warped for analysis or display purposes.

The first processor circuit 102 can be communicatively coupled to a remote server 108 using a network 110. The network 110 can be any suitable wired network, wireless network, or a combination of wired, wireless, or other network. In an example, the network 110 includes a LAN or wireless LAN connection, an internet connection, a point-to-point connection, or other network connection and combinations thereof. The network 110 can be any other type of network that is configured to transmit or receive data from host computers, personal devices, telephones, or any other electronic devices. The network 110 can be a combination of an enterprise network (or the Internet) and a cellular network, in which case, suitable systems and methods are employed to seamlessly communicate between the networks, and a mobile switching gateway can be used to communicate with a computer network gateway to pass data between the networks. The network 110 can include or use any software, hardware, or computer applications that can provide a medium to exchange signals or data in various formats.

The system 100 further can include a display 111 for displaying information generated by the first processor circuit 102, or a speaker 112 for providing audible information generated by the first processor circuit 102, such as including audible responses to user inquiries. In an example, the speaker 112 can provide an audible alert to an occupant of the vehicle 122 about a potential collision with an object. In an example, the display 111 can display information about the alert, such as information about a location of an object relative to the vehicle 122 or information about the object itself. In an example, the display 111 and the speaker 112 can be part of a computing device, such as a personal computer, a laptop, a smart phone, and the like. In an example, the system 100 can be integrated with a vehicle dashboard inside the vehicle 122. Various combinations of visual and/or audible alerts can be provided using the display 111 and speaker 112.

Artificial intelligence-based analysis of information from the image sensor 107 can be performed locally in the system 100 by the video processor circuit 106 or can be performed elsewhere, such as using the remote server 108. In an example, the video processor circuit 106 and/or the remote server 108 can include or access a database 109 configured to store, among other things, object template data, facial image data, name and addresses information of registered users, etc. Artificial intelligence-based analysis can include machine learning, such as can include use of algorithms to parse data, learn from the data, and then later apply what is learned to make informed decisions about new data. Machine learning algorithms can be guided by programmers and, in some cases, machine learning algorithms can become progressively "better" at decision making over time, especially as its reference data set grows.

Deep learning algorithms can be designed to continually analyze new and old data using logic structures for drawing conclusions. In some examples, deep learning uses or employs layers of algorithms, sometimes referred to as a neural network. Neural networks generally use trained models to accomplish various tasks. The models define, at least at a high level, features or processing nodes that are interconnected to move data toward a decision output. The models can be static or dynamic depending on the configuration of the deep learning implementation.

In operation, the video processor circuit 106 can receive video streams/images of information from cameras that are configured to monitor areas near or around the vehicle 122. In an example, the video processor circuit 106 receives the information and converts it into a plurality of static images or frames. The video streams/images can be processed either locally at the video processor circuit 106, or at the remote server 108, such as using machine learning and deep learning, to extract information about objects in the vicinity of the vehicle 122. In an example, the video processor circuit 106 can count or determine a number of people that are within a FOV of the image sensor 107 and can use artificial intelligence to determine whether any people are on a potential collision path with the vehicle 122.

In an example, the video processor circuit 106 receives image information from the image sensor 107 and, by applying artificial intelligence processing, such as including applying a neural network-based analysis for feature extraction from the image information, the video processor circuit 106 can detect one or more objects in a sequence of images. The video processor circuit 106 can classify objects as one or more of a human, plant, other vehicle, sidewalk, traffic cone, or other object that could be near the vehicle 122. In an example, the video processor circuit 106 can track each object in a sequence of images to detect motion of each object. In an example, if the detected object is a human being, then the video processor circuit 106 can further analyze a travel path or direction of the human being, such as to identify whether the human being is, or is likely to be, on a collision path with the vehicle.

The system 100 can be configured to follow various rules that define response behaviors to various detected and classified objects. For example, an end user or system owner can be automatically notified when a particular object or type of motion is detected in the monitored environment. In an example, the speaker 112 and/or the display 111 can be used to provide information about the motion and/or about the object that was detected. In an example, the system 100 can be configured to identify, or can implement artificial intelligence to learn about, various objects that are permitted to be in a vicinity of the vehicle 122.

In an example, the audio first processor circuit 102 can, substantially concurrently with the processing and analysis by the video processor circuit, process audio information from one or more users, either locally or using the remote server 108. Thereafter, the first processor circuit 102 and/or the remote server 108 can combine information about the recognized video data with the audio data to decipher user requests and actions, and automatically service one or more user requests.

In an example, the vehicle 122 can be an autonomous vehicle. In another example, the vehicle 122 can include or use a driver assistance system that can operate in coordination with the system 100 to ensure safety of the vehicle 122 and its passengers. In an example, any alert or warning generated by the system can be used automatically by an autonomous system or can be provided to assist a driver. Although the present disclosure generally refers to the system 100 in the context of the vehicle 122, it will be appreciated that the system 100 can be implemented elsewhere without departing from the scope of the present disclosure.

In an example, the image sensor 107 can be provided on a dashboard of the vehicle 122 and can capture information corresponding to a field-of-view of the vehicle driver. The image sensor 107 can receive information about lane lines of a road of travel of the vehicle 122 and information about a horizon point in a field-of-view of the vehicle 122. The image sensor 107 can continuously operate to capture the surroundings at all times. In an example, the image sensor 107 can include one or more other, non-camera sensors such as a depth sensor or a range sensor. Information from the various sensors can be used by the video processor circuit 106 and/or the first processor circuit 102 to identify objects in the vicinity of the vehicle 122.

In an example, the first processor circuit 102 can receive at least one image from the image sensor 107 and can perform a region-of-interest (ROI) determination to identify regions or areas or zones of interest for further analysis or processing. In an example, the ROI can indicate a collision-prone area in proximity of the vehicle 122 and can be determined based on, among other things, a travel direction or rate of travel of the vehicle 122. In an example, the first processor circuit 102 can perform object detection, such as can include generating one or more notional enclosures for objects identified in an image. The first processor circuit 102 can perform such object detection using a first CNN model.

In an example, an identified object can include a pedestrian or other object such as a tree or light post or traffic cone. The first CNN model can be a single-pass CNN model, such as can be trained on data recorded by the same or other image sensor to have a high recall rate. The first processor circuit 102 can be configured to perform pedestrian detection using a second CNN model, That is, the first processor circuit 102 can be configured to use or apply a first CNN model to perform object detection and can be configured to use or apply a different second. CNN model to perform pedestrian detection, such as using the same or different image information. In an example, pedestrian detection can be based on information about locations of one or more notional enclosures of objects, such as can be generated or determined by the first CNN model. The second CNN model can be different from the first CNN model and can serve as a high accuracy classifier. When a pedestrian is detected using the second CNN model, the first processor circuit 102 can generate an alert using the speaker 112, the display 111, or other means of communicating information about the alert to an operator of the vehicle 122 or to another system or individual.

In an example, a pedestrian object can be identified by a notional enclosure or bounding box using the first CNN model. Information about the bounding box can be displayed to a driver using the display 111 so that the driver becomes aware of the presence of the pedestrian object. In an example, based on a determined distance between the vehicle 122 and the pedestrian, the first processor circuit 102 can generate a collision alert, which can indicate a collision is likely or imminent, and can alert the driver to take preventive action. In an example, the first processor circuit 102 can track each detected object by analyzing a change in coordinates of a corresponding notional enclosure, such as can be detected in consecutive images from the image sensor 107.

In an example, the system 100 can be integrated with existing systems and controls of the vehicle 122 to form an advanced driver assistance system (ADAS), or to augment an existing ADAS. For example, a signal generated by the system 100 or by the first processor circuit 102 can be sent to an operational system of the vehicle, such as an engine control unit (ECU) of the vehicle 122, and the ECU can be caused to automatically apply brakes, disable acceleration, sound a vehicle horn, or take other responsive action to help avoid injury to pedestrians, injury to occupants of the vehicle, or to the vehicle itself.

Figure 2:
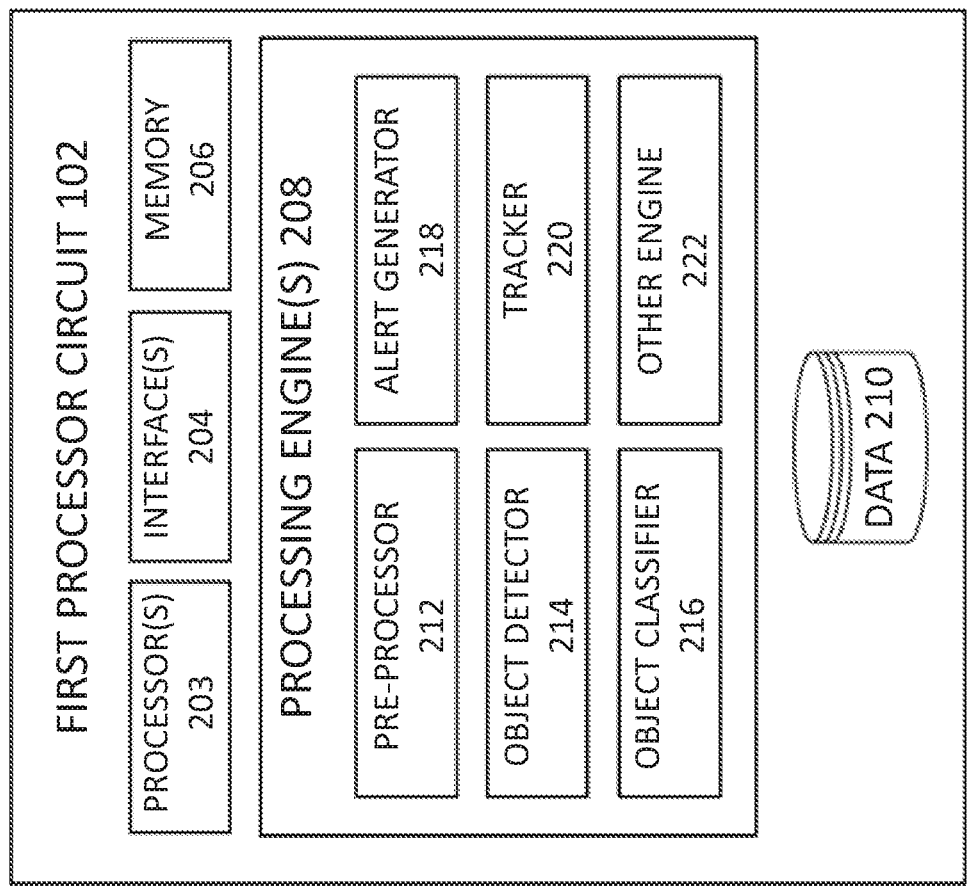
FIG. 2 illustrates generally an example of a first processor circuit.

FIG. 2 illustrates generally an example of the first processor circuit 102. The first processor circuit 102 can comprise all or a portion of one or more of the other processor circuits discussed herein, such as the video processor circuit 106. In an example, the first processor circuit 102 can include one or more processor(s) 203 or processor cores. The one or more processor(s) 203 can be implemented as one or more microprocessor circuits, microcomputers, microcontrollers, digital signal processor circuits, central processor circuits, logic circuitries, and/or any devices that manipulate data based on operational instructions. Among other capabilities, the one or more processor(s) 203 are configured to fetch and execute computer-readable instructions stored in a memory 206. The memory 206 can store one or more computer-readable instructions or routines, which can be fetched and executed to create or share the data units over a network service. The memory 206 can comprise any non-transitory storage device including, for example, volatile memory such as RAM, or nonvolatile memory such as EPROM, flash memory, and the like.

In an example, the first processor circuit 102 can include an interface(s) 204. The interface(s) 204 can comprise a variety of interfaces, for example, interfaces for data input and output devices, referred to as I/O devices, storage devices, and the like. The interface(s) 204 can facilitate communication of first processor circuit 102 with various devices coupled to the first processor circuit 102 such as the image sensor 107, the speaker 112, and the display 111. The interface(s) 204 can provide a communication pathway for one or more components of the first processor circuit 102. Examples of such components include, but are not limited to, processing engine(s) 208 and data 210. In an example, the interface(s) 204 can include communication channels to other vehicle systems, such as an ECU or other sensor or source of information that can provide information about, among other things, a vehicle occupancy, a vehicle speed, UPS coordinates, or other information.

In an example, the processing engine(s) 208 can be implemented as a combination of hardware and programming (for example, programmable instructions) to implement one or more functionalities of the processing engine(s) 208. In examples described herein, such combinations of hardware and programming can be implemented in several different ways. For example, the programming for the processing engine(s) 208 can include processor executable instructions stored on a non-transitory machine-readable storage medium and the hardware for the processing engine(s) 208 can comprise a processing resource (for example, one or more processors), to execute such instructions. In the present examples, the machine-readable storage medium can store instructions that, when executed by the processing resource, implement the processing engine(s) 208. In such examples, the first processor circuit 102 can comprise the machine-readable storage medium storing the instructions and the processing resource to execute the instructions, or the machine-readable storage medium can be separate but accessible to the first processor circuit 102 and the processing resource. In other examples, the processing engine(s) 208 can be implemented by electronic circuitry.

In an example, object detection in one or more images can be performed by the processing engine(s) 208 using a deep learning model. Deep learning can include an artificial intelligence processing technique that learns tasks and feature representations from image and video data and, in an example, is implemented using neural networks such as Convolutional Neural Networks (CNNs). A deep learning model can be used to locate or classify one or more objects in images and video streams. In an example, using a deep learning-based object classifier, the processing engine(s) 208 can categorize detected objects. The categories can include, but are not limited to, humans, pets, plants, devices, and the like. Though techniques for feature extraction and object detection are explained herein as including or using a deep learning model, any other suitable technique for feature extraction and object detection can similarly be used.

The data 210 can comprise data that is stored or is generated as a result of functionalities implemented by any of the components of the processing engine(s) 208.

In an example, the processing engine(s) 208 can comprise a pre-processor 212, an object detector 214, an object classifier 216, an alert generator 218, a tracker 220, and other engine 222, In an example, the pre-processor 212 can receive at least one image from the image sensor 107 and can determine a ROI in the image. The ROI can be a portion of a field-of-view and can indicate a collision-prone area in proximity of the vehicle 122. In an example, the ROI corresponds to a region where pedestrians can be in danger of a potential collision with the vehicle 122. In an example, sidewalk areas or locations greater than a specified distance away from the vehicle 122 can fall outside of an ROI.

In an example, an ROI can be determined based on a rate of travel of the vehicle 122. For example, when the vehicle 122 travels at 40 miles per hour, the ROI can include regions greater than 15 meters away from the vehicle and in a direction of travel of the vehicle 122. Regions less than 15 meters away can be excluded from the ROI because the time to notify the driver and for the driver to react would be insufficient. In an example, the ROI can include regions that are greater than 15 meters away from the vehicle 122 when the vehicle travels at 40 miles per hour. By limiting the ROI, false alarms can be reduced and a processing load can be decreased. In an example, the pre-processor 212 can be configured to determine the ROI. The ROI can be determined in such a manner that the first processor circuit 102 can scan the area within which the vehicle 122 can experience a collision at any given time.

In an example, after an ROI is determined, the object detector 214 can detect objects present in the ROI. In an example, the object detector 214 is configured to identify objects in motion or objects that can move, such as pedestrians, when the vehicle 122 is in motion. In an example, the object detector 214 can generate a notional enclosure around each identified object by using a first CNN model. The notional enclosure of an object can indicate three or more coordinates around or near the identified object.

A CNN model can be understood as a machine learning model that can include a class of deep, feed-forward neural networks that are primarily used to perform object recognition within images. A CNN model can perform object recognition based on classification of images and subsequently clustering of images based on similarity. In an example, the first CNN model can include, but is not limited to, a single-pass CNN model.

In an example, the first CNN model can be trained on data recorded by the image sensor 107 or on data from other sources. In an example, the first CNN model operates at high speed, for example, about 100 frames per second. In an example, processing using the first CNN model is expedited due to the model having relatively few layers or filters for generation of the notional enclosures, or due to direct training of the first CNN model in YUV space instead of RGB space, or due to training of the first CNN model using data recorded by the image sensor 107.

In an example, the object classifier 216 can use location or coordinate information about a notional enclosure to classify an objected contained therein. In an example, the object classifier 216 is configured to use the coordinate information to determine a likelihood that the object is a human being. In an example, the object classifier 216 uses a second CNN model to perform object classification. The second CNN model can be different from the first CNN model. The second CNN model can include a high accuracy classification stage. The second CNN model can be trained on scanning windows of a specific input size, for example, 32*64, and can have relatively few layers, for example, less than 5 layers of scanning. Therefore, processing speed of the second CNN model can be high. In an example, the second CNN model can be trained to operate using differently scaled input or training data. In an example, flexibility and robustness to scale are achieved during the training stage. The second CNN model can be trained with modifications that can include arbitrary croppings or expansions of the notional enclosures. In an example, the second CNN model can assist in classification of candidate objects with high accuracy. In an example, the second CNN model can classify objects in a scanning window within an ROI in tens of milliseconds.

In an example, the alert generator 218 can generate an alert to assist in driving of the vehicle 122. For example, a pedestrian surrounded by a notional enclosure or box can be displayed to the driver using the display 111 so that the driver becomes aware of the presence of the pedestrian. In an example, when there is a reasonable distance between the vehicle 122 and the pedestrian, the alert generator 218 can generate a collision alert, which can indicate a potential collision that can take place if an immediate collision prevention action is not taken by the vehicle 122. The collision alert can be communicated to the driver or another vehicle system. In an example, the collision alert can include any one or a combination of a visual notification, an audio notification, an audio-video notification, and a vibration notification, among others.

In an example, the tracker 220 can track each detected object by analyzing a change in coordinates of a corresponding notional enclosure such as detected in consecutive images obtained from the image sensor 107. The tracker 220 can be configured to determine whether the object is moving in a direction toward the vehicle 122, or in a direction corresponding to a direction of travel of the vehicle 122, such as based on a driving lane and the driving speed of the vehicle 122. For determining the driving lane of the vehicle 122, the object detector 214 can detect a plurality of lane lines of a road one which the vehicle 122 travels and can optionally use a horizon point in a field-of-view of the vehicle 122. In an example, the tracker 220 can determine movement of a detected object or pedestrian along with a lane in which the pedestrian can be present so that alert or warning can be generated when the pedestrian might approach a path of the vehicle 122. Thus, needless alerts can be avoided, for example, when a pedestrian is present on a sidewalk adjacent to the road.

Figure 3A:
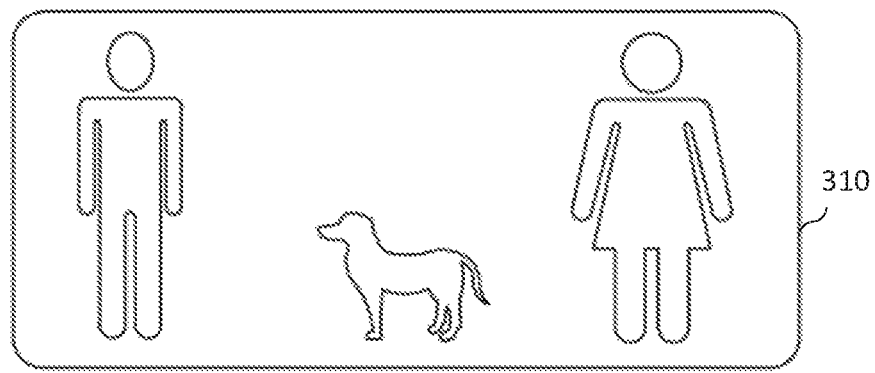
FIGS. 3A-3C illustrate generally an example of a pedestrian recognition process.
Figure 3B:
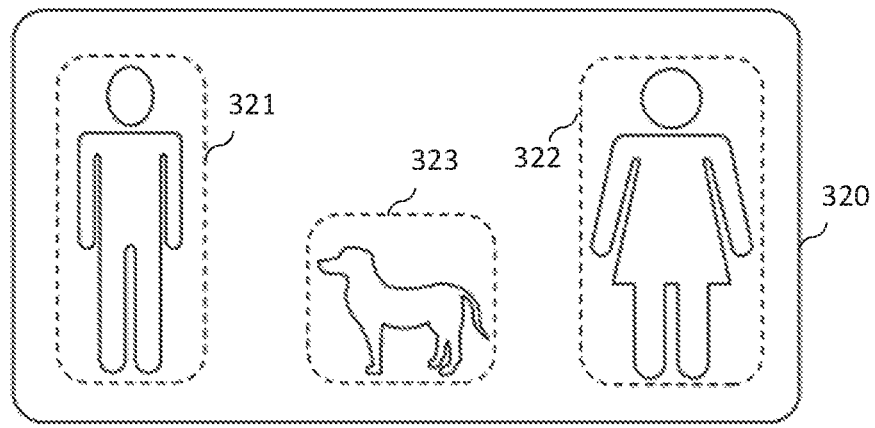
Figure 3C:
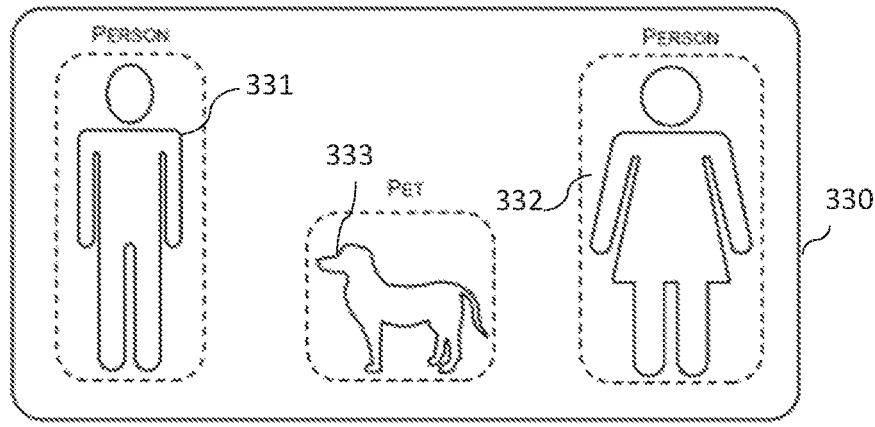

FIGS. 3A-3C illustrate generally an example of a pedestrian recognition process. In an example, the system 100 can capture an image 310 as illustrated in FIG. 3A. The system 100 can use the first CNN to detect one or more objects in the image and can generate a notional enclosure around each of the detected objects. For example, in FIG. 3B, the system 100 can provide a first notional enclosure 321 about a first object, a second notional enclosure about a second object 322, and a third notional enclosure about a third object 323. In the example of FIG. 3B, the notional enclosures are rectangular; other polygons or other shapes can similarly be used to bound or enclose potential objects in an image. In an example, the example of FIG. 3B includes a transitory image 320 from the pedestrian recognition process, and may or may not be displayed or stored.

FIG. 3C illustrates generally a second transitory image 330 that can include classified objects, such as corresponding to each of the notional enclosures from the example of FIG. 3B. In an example, the system 100 can use the second CNN to classify objects from notional enclosures and determine whether any detected object is a pedestrian. For example, a first person object 331 can be identified in the first notional enclosure 321. A second person object 332 can be identified in the second notional enclosure 322. A non-person object 333 can be identified in the third notional enclosure 333. After an object is identified, an image with an annotated bounding box around the pedestrian or other object can be provided to the display 111.

Figure 4A:
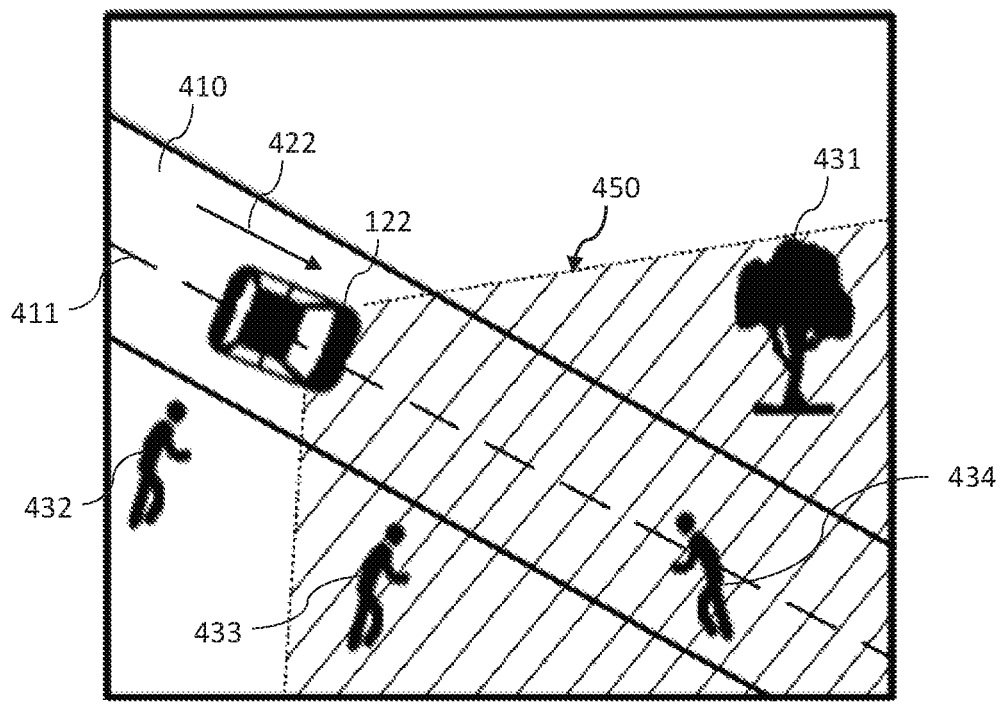
FIGS. 4A-4C illustrate generally an example of pedestrian detection in a region of interest.
Figure 4B:
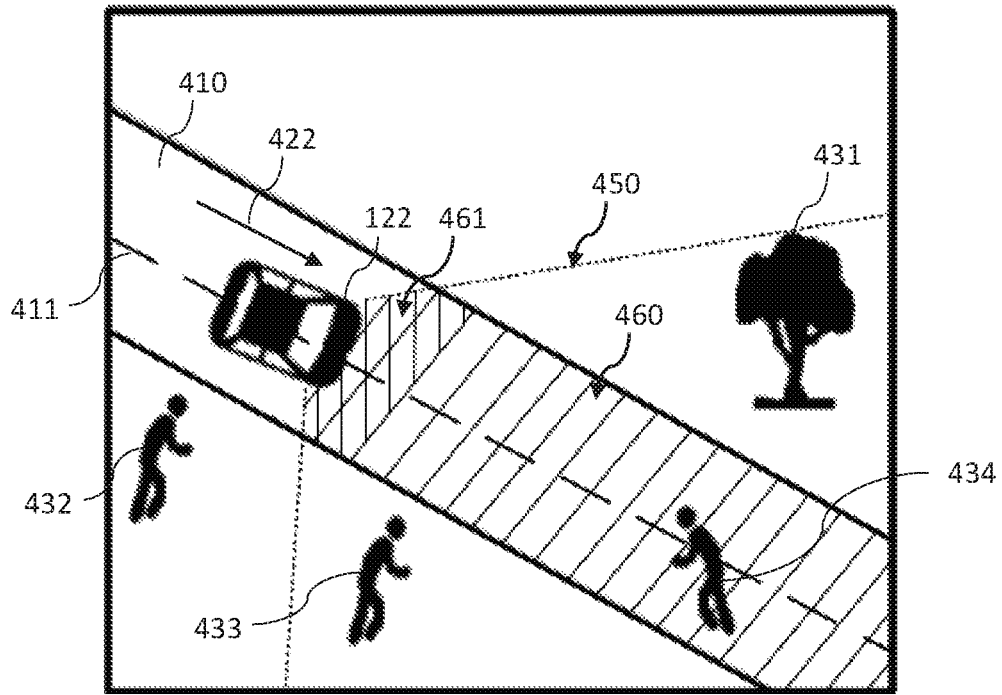
Figure 4C:
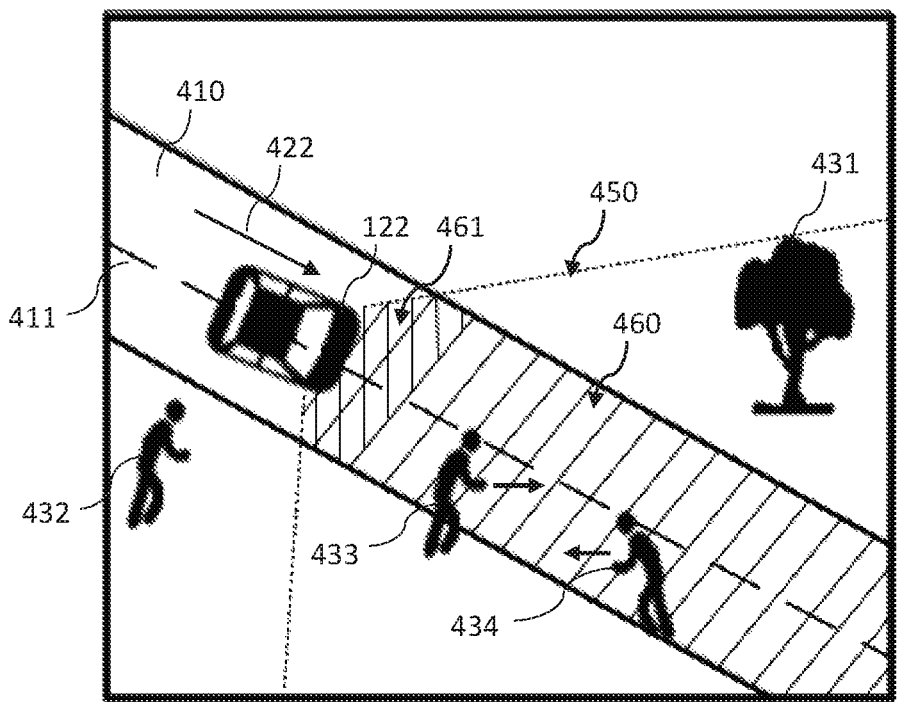

FIGS. 4A-4C illustrate generally an example of pedestrian detection in a region of interest, or ROI. FIG. 4A illustrates a first scene that includes the vehicle 122 traveling on a road 410 in a first direction of travel 422. The road 410 includes lane lines 411. For simplicity of the illustration, the lane lines 411 in the example are represented by one dashed line along a center of the road 410. On real roads, however, lane lines can take many forms, including double lines, broken lines, curved lines, etc., and can have various colors, shapes, thickness, or other characteristics that can be identified by the first processor circuit 102 using images from the image sensor 107 or using information from other sensors.

Various objects are present in the first scene of FIG. 4A in the vicinity of the vehicle 122. For example, the first scene includes a first non-pedestrian object 431, such as a tree. The first scene of FIG. 4A includes a first pedestrian 432, a second pedestrian 433, and a third pedestrian 434. Each of the first, second, and third pedestrians 432, 433, and 434 is at a different location and distance relative to the vehicle 122. In an example, the vehicle 122 is associated with or has a first field of view 450, or FOV 450. The FOV 450 can correspond to a direction of travel of the vehicle 122, and in the example of FIG. 4A, the FOV 450 corresponds to the first direction of travel 422. The FOV 450 can have various dimensions or angles or depths, and can depend on, among other things, a type or orientation of the image sensor 107, a rate of travel of the vehicle 122, or other factor. In the example of the first scene of FIG. 4A, the FOV 450 includes the non-pedestrian object 431, the second pedestrian 433, and the third pedestrian 434. That is, in an example, the image sensor 107 can receive images that include information about each of the non-pedestrian object 431, the second pedestrian 433, and the third pedestrian 434. The received images can be processed, such as using the first processor circuit 102 and one or more of the processing engine(s) 208 therein to perform further analysis on the images, such as to identify whether any pedestrian or other object is in a collision path with the vehicle 122.

FIG. 4B illustrates generally an example of a region of interest 460, or ROI 460, corresponding to a portion of the FOV 450. In the example of FIG. 4B, the ROI 460 includes a portion of the FOV 450 that is in the first direction of travel 422. The ROI 460 can optionally exclude portions of the FOV 450 that are off of or are away from the road 410. For example, a sidewalk adjacent to the road 410 can be excluded from the ROI 460. In an example, the second pedestrian 433 can be located on a sidewalk that is adjacent to the road 410 and therefore the second pedestrian 433 can be considered to be outside of the ROI 460. The third pedestrian 434 can be detected to be on the road 410 and inside of the ROI 460. In an example, if the third pedestrian 434 is detected within a specified threshold distance of the vehicle 122, the system 100 can be configured to provide an alert to an operator of the vehicle 122.

In an example, the ROI 460 includes a portion of the road 410 that is in a travel direction of the vehicle 122. In an example, the ROI 460 excludes a portion of the road 410 in the travel direction of the vehicle 122 but immediately in front of the vehicle 122. The excluded portion can be considered an exclusion area 461. Image information corresponding to the exclusion area 461 can be excluded from object detection or classification processing. In an example, a size of the exclusion area 461 can depend on, among other things, a rate of travel of the vehicle 122, a type or configuration of the image sensor 107, or other sensor information available to the system 100.

FIG. 4C illustrates generally an example of object tracking relative to a region of interest. In the example of FIG. 4C, the third pedestrian 434 can be detected to be in motion such as using the tracker 220. In the example of FIG. 4C, the third pedestrian 434 can be detected to be in motion in a direction that is away from the road 410, and thus away from a collision path with the vehicle 122. Accordingly, a vehicle operator alert about a collision risk posed by the third pedestrian 434 can be suppressed or an urgency of such an alert can be diminished. In an example, if the third pedestrian 434 moves outside of the ROI 460, then an alert about the third pedestrian 434 can be removed or muted, for example, to reduce a number of distractions to the operator of the vehicle 122.

In the example of FIG. 4C, the second pedestrian 433 can be detected to be in motion in a direction that is toward the road 410 and that approaches or includes a collision path with the vehicle 122. Accordingly, a vehicle operator alert about a collision risk posed by the second pedestrian 433 can be generated and the alert can be prioritized depending on a proximity of the second pedestrian 433 to the vehicle 122. In an example, the system 100 can track movement of the second pedestrian 433 when the second pedestrian 433 is outside of the ROI 460.

In an example, a low priority alert can include one of a visual alert using the display 111 or an audible alert using the speaker 112. A medium priority alert can include both of a visual alert and an audible alert. A high priority alert can include enhanced visual and/or audible alerts, such as including flashing lights or loud alarms. In an example, a high priority alert can include an intervention in a system of the vehicle 122, such as an intervention to automatically apply brakes, sound a horn, or other action to alert a vehicle operator and/or to alert the pedestrian in the collision path with the vehicle 122.

FIG. 5 illustrates generally an example of a method 500 that can include using the system 100 and first and second convolutional neural networks to identify objects in proximity of the vehicle 122. The method 500 can include, at step 501, receiving image information from the image sensor 107. The image information can include information in a visible light range or infrared range or other range that can be used to identify one or more objects in proximity of the vehicle 122. In an example, the image information received at step 501 is provided to the first processor circuit 102 for analysis and object recognition using neural network-based processing. The image information can correspond to a particular field of view, or FOV, which can be a function of the image sensor 107 itself. In an example, receiving the image information at step 501 includes receiving image information from all directions around the vehicle 122.

At step 502, the method 500 can include receiving vehicle status information about the vehicle 122. Vehicle status information can include, among other things, rate of travel information, acceleration information, information about one or more occupants of the vehicle 122, information from other sensors inside or outside of the vehicle 122, GPS coordinates of the vehicle 122, or other information.

At step 503, the method 500 can include determining a region of interest, or ROI, in the FOV using the system 100. In an example, the ROI can be determined using the pre-processor 212. The ROI can be defined relative to the vehicle 122. That is, the ROI can depend upon various characteristics of the vehicle itself, such as including a rate of travel and a direction of travel of the vehicle 122. In an example, the ROI comprises a portion of the FOV or comprises all of the FOV. In an example, the ROI excludes portions of the FOV that are less than a particular specified distance away from the vehicle 122. Image information from such an excluded portion can be omitted from image processing or analysis to reduce processing load and processing time. The excluded portion generally can correspond to a region sufficiently near the vehicle that any automated alert would be ineffective because the response time of the operator of the vehicle and/or of the vehicle systems themselves would be too long. In an example, dimensions of extents of an excluded portion can change dynamically in correspondence with factors such as a rate of travel of the vehicle 122, terrain, direction of travel, or other factors.

At step 504, the system 100 can analyze the image information to detect whether any object of interest is present in the ROI. For example, step 504 can include using the object detector 214 to determine whether the ROI includes any objects or potential objects. In an example, the object detector 214 can include or use a first CNN model 511 to perform a machine learning-based analysis using the image information received at step 501. In an example, the first CNN model includes a single-pass CNN model configured to identify animate and/or inanimate objects in the ROI. In the example of FIG. 5, step 504 includes detecting a first object in the ROI.

At step 505, the system 100 can determine a notional enclosure for the first object detected at step 504. In an example, step 505 can include using the object detector 214 to determine a notional boundary for the first object, and optionally for one or more other objects detected in the image. A notional boundary can include, generally, a polygon, ellipse, or other geometric means of enclosing an object or figure in an image. In an example, a notional boundary corresponds to a two-dimensional outline for an identified object. For example, a notional boundary can include a box that grossly or generally surrounds a human form or can include a polygon or splines that more closely follow contours of the human form in the image. In an example, the system 100 can store information about the first object and/or about the determined notional enclosure for the first object. In an example, information about the first object can be displayed using the display 111 together with a pictorial representation of the notional enclosure. In an example, the pictorial representation can help highlight or draw attention to particular areas of the display 111 corresponding to an identified object.

At step 506, the system 100 can analyze the first object to determine a classification for the first object. For example, step 506 can include using the object classifier 216 to determine whether the first object includes, or is likely to include, a human being. In an example, the object classifier 216 can include or use a second CNN model 512 to perform a machine learning-based analysis using the image information received at step 501, or using a processed version of the image information from step 501. In an example, the second CNN model includes a single-pass CNN model configured to classify objects as human or non-human. In an example, the second CNN model is configured to further classify non-human objects such as to determine whether the objects are animate or ambulatory and, therefore, could pose a potential collision risk to the vehicle 122.

At step 507, the method 500 can include providing an alert to an operator of the vehicle 122 when the object classified at step 506 is determined to be human or otherwise ambulatory and the object is on a potential collision course with the vehicle. In an example, the alert can include an audible alert, such as provided to the operator using the speaker 112. In an example, the alert can include a visual alert, such as provided to the operator using the display 111. In an example, the alert can include a haptic or vibratory alert that can be provided to the operator. In an example, the operator of the vehicle 122 can be an ECU or other system or device that controls an aspect of the vehicle. Thus in an example providing an alert to an operator at step 507 can include providing a signal or instruction to such ECU or other system or device to update a function of the vehicle 122. In an example, the signal or instruction can cause the vehicle 122 to slow down, speed up, change direction, or to take some other mitigating action to avoid a collision course with a classified object.

In an example, at step 506, the classified object can be determined to be non-human or stationary. In this case, an alert can be suppressed or no alert can be provided to the vehicle operator. The system 100 can optionally be configured to provide an operator alert when particular non-human objects are identified at step 506. For example, the system 100 can be configured to recognize wildlife such as deer, raccoons, or other animals that may come into a travel path of vehicles. The method 500 can be repeated for each of multiple frames of image information received from the image sensor 107 or received from another source.

Figure 6:
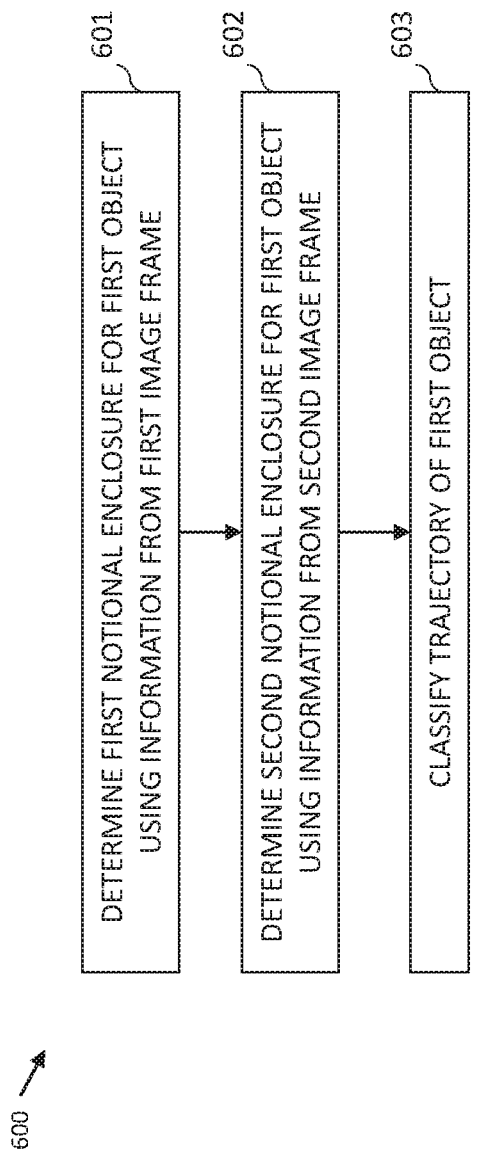
FIG. 6 illustrates generally an example of a method that can include determining a trajectory for a classified object using the system of FIG. 1.

FIG. 6 illustrates generally an example of a method 600 that can include determining a trajectory for a classified object using the system 100. In an example, the system 100 can use the image sensor 107 to receive a series of consecutive frames or images. At step 601, the method 600 can include determining a first notional enclosure for a first object using information from a first frame. In an example, the first notional enclosure can be determined according to the discussion above, for example, at step 505 from the example of FIG. 5. Determining the first notional enclosure at step 601 can include determining first coordinates associated with the first object, or associated with some portion of the first object.

At step 602, the method 600 can include determining a second notional enclosure for the same first object, such as using information from a different second frame. In an example, the different second frame is a time-adjacent frame to the first frame. In an example, the second notional enclosure can be determined according to the discussion above, for example, at step 505 from the example of FIG. 5. Determining the second notional enclosure at step 602 can include determining coordinates associated with the first object, or associated with some portion of the first object.

At step 603, the method 600 can include classifying a trajectory of the first object using the notional enclosure information determined at steps 601 and 602. In an example, the tracker 220 can be used to classify the trajectory of the first object. For example, coordinates of the respective notional enclosures can be received and differences in the coordinates can be measured. If the coordinates differ in a manner that is commensurate with an expected difference due to object movement, then movement of the first object can be confirmed or verified. For example, particular types of movement or rates of movement can be defined for different classes of objects. Thus if an object is classified as being of a particular type and the object's detected rate of movement is inconsistent with an object of its class, then an error can be generated or an alert can be discarded. On the other hand, if the movement or rate of movement is consistent with a prescribed class, then the trajectory can be further analyzed to determine whether it could lead to a potential collision with the vehicle 122.

Figure 7:
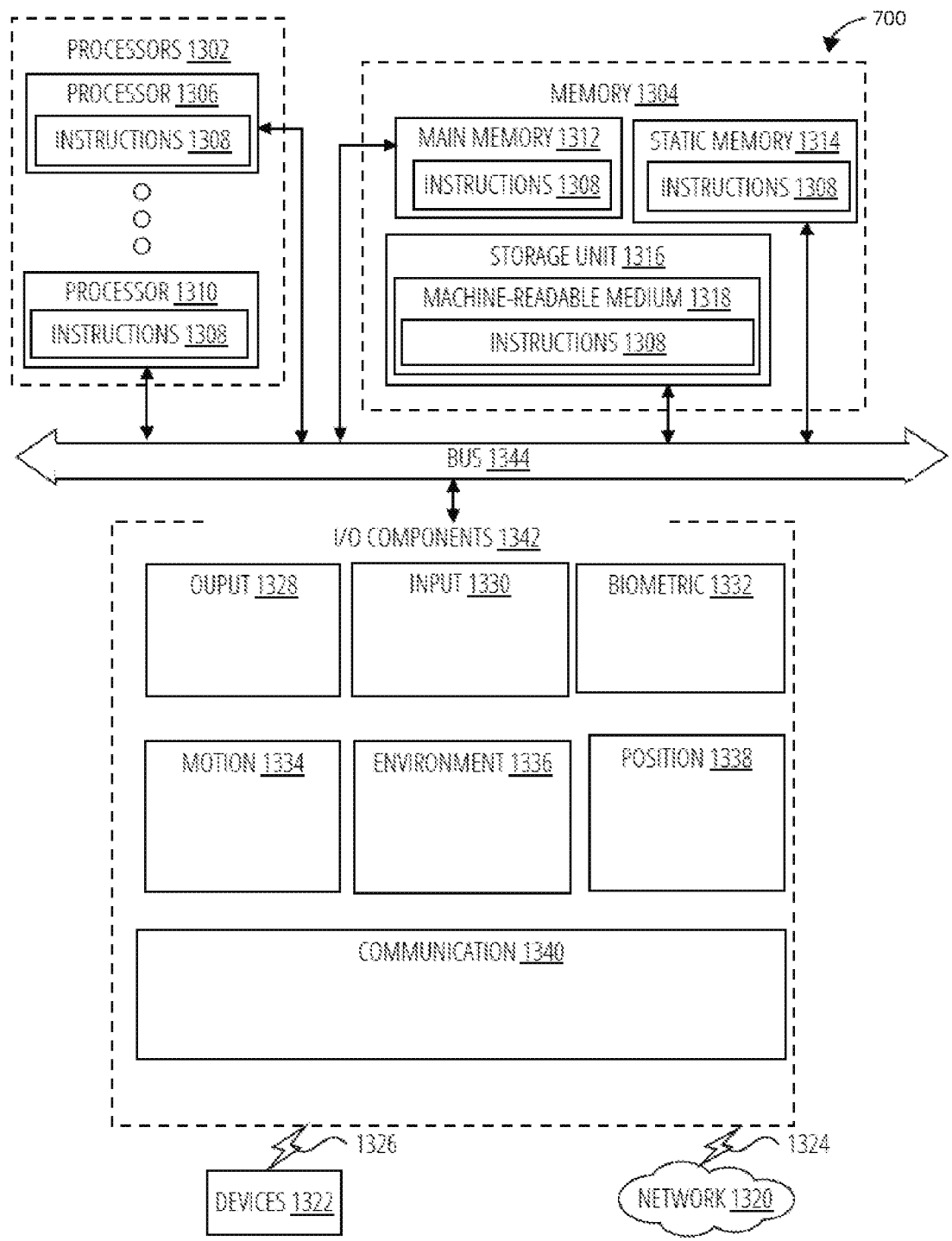
FIG. 7 illustrates generally an example of a machine in the form of a computer system within which instructions can be executed to cause the machine to perform any one or more of the methods discussed herein.

FIG. 7 illustrates generally an example of a machine 1200 in the form of a computer system within which instructions 1308 can be executed to cause the machine to perform any one or more of the methods discussed herein. In an example, the machine 1200 comprises a portion of the system 100, or one or more portions of the system 100 comprise an instance of the machine 1200. The instructions 1308 can include software, a program, an application, an apples, an app, or other executable code that causes or configures the machine 1200 to perform any one or more of the methods discussed herein, or portions of such methods. For example, the instructions 1308 can cause the machine 1200 to execute any one or more of the methods described herein. The instructions 1308 transform a general, non-programmed machine into a particular machine configured or programmed to carry out the described and illustrated functions.

The machine 1200 can operate as a standalone device or can be coupled (e.g., networked) to other machines. In a networked deployment, the machine 1200 can operate in the capacity of a server machine or a client machine in a server-client network environment, or as a peer machine in a peer-to-peer (or distributed) network environment. The machine 1200 can comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1308, sequentially or otherwise, that specify actions to be taken by the machine 1200. Further, while only a single machine 1200 is illustrated, the term "machine" shall also be taken to include a collection of machines that individually or jointly execute the instructions 1308 to perform any one or more of the methodologies discussed herein.

The machine 1200 can include processors 1302, memory 1304, and I/O components 1342, which can be configured to communicate with each other via a bus 1344. In an example, the processors 1302 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) can include, for example, a processor 1306 and a processor 1310 that execute the instructions 1308. The term "processor" is intended to include multi-core processors that can comprise two or more independent processors (sometimes referred to as "cores") that can execute instructions contemporaneously. Although FIG. 12 shows multiple processors 1302, the machine 1200 can include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, both accessible to the processors 1302 via the bus 1344. The main memory 1304, the static memory 1314, and storage unit 1316 store the instructions 1308 embodying any one or more of the methodologies or functions described herein. The instructions 1308 can also reside, completely or partially, within the main memory 1312, within the static memory 1314, within machine-readable medium 1318 within the storage unit 1316, within at least one of the processors 1302 (e.g., within the processor's cache memory), or any suitable combination thereof, during execution thereof by the machine 1200.

The I/O components 1342 can include a wide variety of components to receive input, provide output, produce output, transmit information, exchange information, capture measurements, and so on. The specific 110 components 1342 that are included in a particular machine will depend on the type of machine. For example, portable machines such as mobile phones can include a touch input device or other such input mechanisms, while a headless server machine will likely not include such a touch input device. It will be appreciated that the I/O components 1342 can include many other components that are not shown in FIG. 12. In various example examples, the I/O components 1342 can include output components 1328 and input components 1330. In an example, the I/O components 1342 include the image sensor 107, the speaker 112, and/or the display 111. The output components 1328 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1330 can include one or more cameras, alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example examples, the I/O components 1342 can include biometric components 1332, motion components 1334, environmental components 1336, or position components 1338, among a wide array of other components. For example, the biometric components 1332 include components to detect human presence in a vehicle, detect human expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth.

The environmental components 1336 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment. The position components 1338 can include location sensor components (e.g., a GPS receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1342 further include communication components 1340 operable to couple the machine 1200 to a network 1320 or devices 1322 via a coupling 1324 and a coupling 1326, respectively. For example, the communication components 1340 can include a network interface component or another suitable device to interface with the network 1320. In further examples, the communication components 1340 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1322 can be another machine or any of a wide variety of peripheral devices (e.g., a peripheral device coupled via a USB).

Moreover, the communication components 1340 can detect identifiers or include components operable to detect identifiers. For example, the communication components 1340 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1340, such as location via Internet Protocol (IP) geolocation, location via Wi-Fi® signal triangulation, location via detecting an NFC beacon signal that can indicate a particular location, and so forth.

The various memories memory 1304, main memory 1312, static memory 1314, and/or memory of the processors 1302) and/or storage unit 1316 can store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 can be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 can be transmitted or received using a transmission medium via the coupling 1326 (e.g., a peer-to-peer coupling) to the devices 1322.

Various Notes

The above description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round," a component that is not precisely circular (e.g., one that is slightly oblong or is a many-sided polygon) is still encompassed by this description.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like. The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A method for determining whether an object is in a travel path of a vehicle, the method comprising:
receiving images from an image sensor, the image sensor coupled to a vehicle and the images corresponding to a first field of view (FOV);
identifying a first object in the images from the image sensor, the identifying including using a machine learning-based first single-pass neural network to process the images;
based on the identified first object, determining respective notional enclosures for the identified first object for each image, the notional enclosures bounding the identified first object and comprising less than all of the respective images;
scaling image information corresponding to the notional enclosures to provide scaled image information about the identified first object;
based on the scaled image information about the identified first object, classifying the identified first object as including an ambulatory object or a non-ambulatory object;
determining whether the vehicle is on a potential collision path with the identified first object; and
providing an alert to an operator of the vehicle about the identified first object or about the potential collision path.

2. The method of claim 1, wherein the determining the notional enclosures for the identified first object includes using the computer system to apply the same first single-pass neural network or a different second neural network to generate information about one or more coordinates corresponding to the first object in the images.

3. The method of claim 2, wherein the classifying the identified first object includes applying a different third neural network to classify the identified first object as an ambulatory object or a non-ambulatory object.

4. The method of claim 3, wherein the classifying the identified first object includes using the different third neural network to classify the identified first object as a pedestrian or a non-pedestrian.

5. The method of claim 1, further comprising receiving information about a travel direction or rate of travel of the vehicle, wherein the determining the notional enclosures includes using information about the travel direction or the rate of travel to determine which portion of the images to include in the notional enclosure.

6. The method of claim 5, further comprising determining an exclusion area that comprises a portion of the FOV but is outside of the notional enclosures, and wherein the identifying the first object includes inside of the notional enclosures and outside of the exclusion area.

7. The method of claim 1, further comprising determining a travel direction or a rate of travel of the ambulatory object based on information from multiple ones of the images, and using information about the travel direction or the rate of travel to determine whether the ambulatory object is in the potential collision path with the vehicle.

8. The method of claim 7, further comprising determining respective notional enclosures for the same first object in respective consecutive images received from the image sensor, and wherein the determining the travel direction includes using information about the notional enclosures.

9. The method of claim 1, wherein the receiving the images from the image sensor includes receiving consecutive images from the same camera or receiving images from different cameras having different fields of view.

10. The method of claim 1, wherein the providing the alert to the operator of the vehicle includes providing one or more of a visual alert to a driver, an audible alert to a driver, or a control signal to an operational system of the vehicle.

11. A pedestrian detection system implemented in a vehicle, the system comprising:
an input unit comprising at least one image sensor for imaging areas around the vehicle; and
a processing unit comprising a processor circuit coupled with a non-transitory memory circuit, the memory circuit storing instructions executable by the processor circuit to cause the processor circuit to:
receive multiple frames of image information from the input unit;
detect, using a first single-pass Convolutional Neural Network (CNN) model to analyze each of the multiple frames, one or more candidate pedestrian objects present in the frames;
based on the detected one or more candidate pedestrian objects, generate respective notional enclosures around each of the detected one or more candidate pedestrian objects, wherein each notional enclosure represents less than an entire area of the respective frame and indicates one or more coordinates of a respective enclosed object;
scale image information corresponding to the respective notional enclosures to provide scaled image information; and
determine, using the scaled image information, whether any of the detected one or more candidate pedestrian objects is a pedestrian using a second CNN model and using the coordinates of the notional enclosures.

12. The system of claim 11, wherein the instructions executable by the processor circuit to cause the processor circuit to determine a region of interest (ROI) for at least one of the frames based on a rate of travel of the vehicle, wherein the ROI indicates a collision-prone area proximate the vehicle.

13. The pedestrian detection system of claim 12, wherein the one or more candidate pedestrian objects are detected inside the determined ROI.

14. The system of claim 12, wherein the instructions executable by the processor circuit to cause the processor circuit to determine an exclusion area inside of a field of view of the input unit and outside of the ROI.

15. The system of claim 14, further comprising a driver interface configured to provide audio and/or visual cues to a driver of the vehicle about potential driving hazards, and wherein the instructions executable by the processor circuit are further configured to cause the processor circuit to provide an audible alert and/or a visual alert to the driver when the detected one or more candidate pedestrian objects is determined to be a pedestrian who is in the ROI.

16. A system for determining whether an object is in a travel path of a vehicle, the system comprising:
a first camera coupled to the vehicle and configured to receive image information about one or more areas around the vehicle; and
a processor circuit configured to:
apply a single-pass first convolutional neural network model to identify a first object present in each of multiple frames of the image information;

using information about the identified first object, determine respective notional enclosures for respective portions of the image information that bounds the identified first object, the notional enclosures representing less than all of the image information;

scale image information corresponding to the notional enclosures to provide first scaled information;

apply the first scaled information to a second convolutional neural network model to classify the identified first object in the notional enclosures as including one of a non-ambulatory object, an ambulatory object not on a collision path with the vehicle, or an ambulatory object on a collision path with the vehicle, wherein the second convolutional neural network model is trained using a plurality of images of pedestrians; and provide an alert to an operator of the vehicle about the identified first object or about the collision path.

17. The system of claim 16, wherein the first camera is configured to receive image information that includes a series of sequential images, and wherein the processor circuit is configured to:

apply the first convolutional neural network model to identify the same first object in each image in the series of sequential images;

determine respective notional enclosures for each instance of the first object in each image in the series of sequential images;

determine whether the first object is in motion based on coordinate information about the respective notional enclosures; and determine whether the first object is on a collision path with the vehicle using information determined about whether the first object is in motion.

18. The system of claim 16, wherein the single-pass first convolutional neural network model is trained using YUV color space data.

* * * * *